US010675124B2

(12) United States Patent
Burseth et al.

(10) Patent No.: US 10,675,124 B2
(45) Date of Patent: Jun. 9, 2020

(54) DEVICE AND SYSTEM TO IMPROVE ASEPSIS IN DENTAL APPARATUS

(71) Applicants: Chris Burseth, Crystal Lake, IL (US); Michael Burseth, Crystal Lake, IL (US)

(72) Inventors: Chris Burseth, Crystal Lake, IL (US); Michael Burseth, Crystal Lake, IL (US)

(*) Notice: Subject to any disclaimer, the term of this patent is extended or adjusted under 35 U.S.C. 154(b) by 0 days.

(21) Appl. No.: 15/872,368

(22) Filed: Jan. 16, 2018

(65) Prior Publication Data

US 2018/0134585 A1    May 17, 2018

Related U.S. Application Data

(63) Continuation of application No. 15/133,931, filed on Apr. 20, 2016, now abandoned.

(Continued)

(51) Int. Cl.
*A61C 1/00*        (2006.01)
*C02F 1/32*        (2006.01)
(Continued)

(52) U.S. Cl.
CPC .......... *A61C 1/0076* (2013.01); *A61C 1/0084* (2013.01); *C02F 1/325* (2013.01);
(Continued)

(58) Field of Classification Search
None
See application file for complete search history.

(56) References Cited

U.S. PATENT DOCUMENTS 4,017,735 A * 4/1977 Siegel .................... A01K 63/04
                                                      250/430
5,925,257 A   7/1999 Albelda
(Continued)

OTHER PUBLICATIONS

"Efficiency of Point-of-Use Water Disinfection Using Deep UV Light Emitting Diode Technology"; Gaska et al.; NSTI-Nanotech 2011, www.nsti.org, ISBN 978-1-4398-7138-6; vol. 3; 2011, pp. 612-615.

(Continued)

*Primary Examiner* — Michael J Logie
(74) *Attorney, Agent, or Firm* — Vidas, Arrett & Steinkraus, P.A.

(57) ABSTRACT

A method and system to improve asepsis during dental delivery includes a self-contained water delivery apparatus and a vacuum apparatus both of which provide disinfection of biohazards occurring during dental procedures. A UVC LED light emitting unit, with sanitary connections, may be releasably connected to the delivery and vacuum apparatus for improved maintenance and cleaning. A reservoir egress connector provides releasable engagement, fluid agitation, and unrestricted UV light transmission to improve water quality, reduce biofilm water contamination, reduce cross contamination, and reduce the potential spread of pathogens. The mounting system for the UVC LED light unit allows the apparatus to be used to decontaminate portable dental delivery units and vacuum units upon closure. A reflective interior of the cases improves irradiation of the enclosed system, reducing the risk and spread of pathogens.

20 Claims, 8 Drawing Sheets

Related U.S. Application Data

(60) Provisional application No. 62/150,443, filed on Apr. 21, 2015.

(51) Int. Cl.
  *C02F 103/00* (2006.01)
  *C02F 103/02* (2006.01)

(52) U.S. Cl.
  CPC .. *C02F 2103/006* (2013.01); *C02F 2103/026* (2013.01); *C02F 2201/3222* (2013.01)

(56) References Cited

U.S. PATENT DOCUMENTS

| | | | |
|---|---|---|---|
| 6,268,607 B1 | 7/2001 | March et al. | |
| 6,464,868 B1* | 10/2002 | Korin | C02F 1/78 134/166 C |
| 7,081,225 B1* | 7/2006 | Hollander | A61L 2/10 210/748.11 |
| 7,329,385 B1* | 2/2008 | Radicone | A61C 1/0076 210/753 |
| 8,066,941 B2* | 11/2011 | Denkewicz, Jr. | C02F 1/325 210/192 |
| 8,226,831 B2 | 7/2012 | Maiden | |
| 8,529,770 B2 | 9/2013 | Yencho | |
| 8,653,481 B2 | 2/2014 | Packman et al. | |
| 8,872,130 B1 | 10/2014 | Matthews et al. | |
| 8,890,087 B2 | 11/2014 | Ben-David et al. | |
| 9,592,102 B2* | 3/2017 | Knight | A61C 1/0076 |
| 2003/0036033 A1 | 2/2003 | Chandler | |
| 2003/0086848 A1 | 5/2003 | Saccomanno | |
| 2004/0222163 A1* | 11/2004 | Saccomanno | A61L 2/10 210/748.11 |
| 2009/0169442 A1* | 7/2009 | Levy | C02F 1/325 422/186.3 |
| 2012/0039751 A1* | 2/2012 | Shenberg | A61L 2/183 422/119 |
| 2012/0061695 A1* | 3/2012 | Kim | H01L 33/486 257/88 |
| 2012/0241644 A1 | 9/2012 | Ben-David | |
| 2015/0114912 A1* | 4/2015 | Taghipour | C02F 1/325 210/748.11 |
| 2015/0233890 A1* | 8/2015 | Urisu | G01N 33/48728 435/287.9 |
| 2015/0314024 A1* | 11/2015 | Khan | C02F 1/325 250/435 |
| 2016/0214076 A1* | 7/2016 | Kiremitci | C02F 1/325 |
| 2016/0280562 A1* | 9/2016 | Liao | C02F 1/008 |

OTHER PUBLICATIONS

"New UV Technology for Point-of-Use Water Disinfection"; Bilenko et al.; Clean Technology 2010, www.ct-si.org, ISBN 978-1-4398-3419-0; pp. 339-342.

* cited by examiner

DEVICE AND SYSTEM TO IMPROVE ASEPSIS IN DENTAL APPARATUS

CROSS-REFERENCE TO RELATED APPLICATIONS

This application is a continuation application of U.S. Ser. No. 15/133,931, filed Apr. 20, 2016 which claims the benefit of U.S. Provisional Patent Application Ser. No. 62/150,443 filed Apr. 21, 2015, which are incorporated by reference herein in their entirety.

BACKGROUND OF THE INVENTION

A majority of dental delivery systems in offices and remote field units rely on the use of self-contained water bottle systems which are prone to cross-contamination when used in accordance with commonly accepted cleaning procedures and present day protocols.

Bacterial growth within the self-contained water bottle systems is well known and biofilm formation within the waterlines may lead to levels exceeding the 500 CFU/ml EPA standard for drinking water. Warm water in these systems coupled with low flow rates may greatly increase rates of bacterial colonization, which often occurs between existing maintenance procedures. Contaminated dental waterlines may pose a public health risk especially for the elderly and immunocompromised.

Cross contamination with bacteria or viral pathogens may also occur during bottle replacement; most notable if the feeder tube is touched during the procedure. Touching of a feeder tube during a bottle replacement procedure may cause cross contamination with bacteria or viral pathogens. In addition, an insufficient frequency of water replacement within the bottle may result in elevated bacterial counts. The chance for error and cross contamination during bottle replacement may also increase with greater procedural frequency.

In the past, most prior UV water purification units for use in a dental environment have relied upon the use of mercury arc bulbs. Mercury arc bulbs are bulky, relatively fragile, and operate at extremely hot temperatures during use. The use of mercury arc bulbs is potentially dangerous to dental practitioners and patients.

In the past maintenance of dental waterlines has occurred through the use of chemical agents, operating on a continuous basis, during water delivery. The use of chemical agents during water delivery may impose a number of undesirable consequences. The use of chlorine as an agent may be caustic to metals and may not penetrate existing biofilm. Iodine may in rare instances give rise to allergic reactions to individuals. Hydrogen peroxide and acetic acid have been demonstrated to be an effective cleaning agent when used on an intermittent basis, followed by line flushing, however, intermittent maintenance of waterlines relying on the use of chemical agents frequently is unable to prevent the reintroduction of bacteria into the lines, resulting in the formation of a slime biofilm in a period of time as short as two weeks.

Dental waterlines are subject to bacterial contamination and biofilm formation. Limiting the introduction of bacteria into the dental delivery systems including self-contained water bottle systems is problematic particularly when used in an office environment as well as remote dental field applications, where adequate water quality cannot be assured.

A number of existing self-contained water bottle delivery systems use a seated bottom and narrow fill neck, which in turn increases the difficulty of maintaining and cleaning of a water bottle and/or the self-contained water bottle delivery system when replacing water within the bottle.

Existing portable vacuum units used in non-traditional dental office environments such as a nursing home facility, or during remote dental field applications, may pose a risk for spreading pathogens as biohazard effluents. A system to improve and limit potential pathogen spread is problematic during dental procedures and oral evacuation in at risk settings, especially where aerosolizing and direct contact of bacterial or viral agents may occur.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. § 1.56(a) exists.

All U.S. patents and applications and all other published documents mentioned anywhere in this application are incorporated herein by reference in their entirety.

Without limiting the scope of the invention, a brief description of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. § 1.72.

GENERAL DESCRIPTION OF THE INVENTION

In some embodiments, a method and system device is disclosed to improve asepsis during dental delivery. The method and system device includes a self-contained water delivery apparatus having a UVC Light Emitting Diode (LED) light source which is constructed and arranged to replace existing self-contained water bottle delivery systems. During use, water is placed into the reservoir of the self-contained water delivery apparatus. The water in the reservoir interior is exposed to germicidal UVC irradiation which reduces bacterial and pathogenic contamination. The method and system device also includes a vacuum apparatus and vacuum efflux assembly having a UVC Light Emitting Diode (LED) light source, the vacuum efflux assembly being constructed and arranged to capture dental efflux, where exposure of the efflux in the vacuum efflux assembly to UVC irradiation improves the handling of biohazards generated during oral evacuation.

In some alternative embodiments, the method and system device additionally includes a reservoir egress connector, an open ended reservoir body which may be formed of an FDA compliant medical grade UV resistant material, and a UVC LED light emitting unit.

In at least one additional embodiment, the reservoir egress connector may be formed of an FDA compliant medical grade UV resistant material, having a plurality of ports, where certain ports provide an incoming air source air, and other ports provide purified water outflow, and additional ports support a pressure release function.

In at least one alternative embodiment, the reservoir egress connector may include two flexible connectors that unite one or more UV grade tubes, which in turn extend into the reservoir body.

In some embodiments, a self-contained water bottle delivery system is disclosed having a reservoir egress connector, the reservoir egress connector having at least one tube extending into the reservoir body to provide agitation of the water column to improve UV germicidal irradiation.

In any number of embodiments, agitation of the water column may occur during hand piece, or a water syringe use, through the manipulation of a manual purge switch connected to a port, or by connecting a port to a power purge control box.

In any number of embodiments, a port of the reservoir egress connector may be connected by an airline to the power purge control box, and the power purge control box may house an air activated electric switch, a normally closed air purge valve, a programmable timer module, and power input and power output adaptors.

In at least one embodiment, air pressure upon turning on the unit activates the air electric switch and starts the programmable timer which powers and opens the purge valve for a desired number of seconds, which in some embodiments may be approximately 60 seconds.

In some embodiments, the air purge valve remains open for an initial period of time of more, less, or equal to 60 seconds as power is supplied to the UVC LED light emitting unit facilitating agitation of the water within the reservoir body, whereupon UVC light emission is exposed to water column to completely irradiate the water column with UV light.

In any number of embodiments, the UVC LED light emitting unit may be comprised of a light source body housing a UVC LED source emitting light having a wavelength in the range of approximately 270 nm to 280 nm, a heat sink and an internal ultracapacitor or rechargeable battery. The UVC LED light source unit may have symmetrical upper and lower assemblies, where the upper assembly has a UV grade window. The lower assembly may house an external DC power adaptor.

In any number of embodiments, the symmetrical upper and lower assemblies permit connection of the UVC LED light emitting assembly to the reservoir body as well as connection to a base mount assembly.

In any number of embodiments, a base mount assembly may be installed into portable dental delivery cases and portable dental delivery vacuum units. The UVC LED light emitting unit may be removed from the reservoir body or vacuum efflux reservoir, and attached to the case base mount assembly to provide germicidal UV light exposure into the case interior, reducing bacterial and pathogenic contamination within the case upon closure.

In any number of embodiments, the UVC LED light emitting unit may be used in accordance with any method, device, or assembly described herein, including use within a case where the interior of the case has a reflective liner which may aid in distribution of germicidal light within the case upon closure.

In at least one embodiment, the UVC LED light emitting unit may be used to provide germicidal UV light exposure into the case interior to reduce the potential for mold formation during case storage.

In at least one embodiment, the UVC LED light emitting unit may provide germicidal irradiation to a vacuum efflux reservoir to purify biohazards generated during dental procedures.

In some embodiments, the vacuum apparatus may include a vacuum efflux assembly having a UVC LED light emitting unit which is uniquely suited for use in a nursing home or outreach dental setting, with the incorporation of commercial non-spill input and output connectors that attach to the vacuum efflux reservoir by means of a unique sanitary adapter.

In some alternative embodiments, the vacuum efflux assembly may be case mounted for portability, with the unique ability to operate closed, with the incorporation of commercial medical grade non-spill input and output connectors which pass through the exterior shell of the case.

In some embodiments, the vacuum efflux assembly when mounted within a case may be preceded and connected to a removable and recyclable solids collector and followed by a medical grade air vacuum filter.

In some alternative embodiments, a reflective liner on the interior shell of the case improves UVC LED irradiation of the case contents to minimize growth or spreading of bacteria and pathogens.

In some embodiments, the vacuum adapter assembly provides agitation of the fluid efflux for complete UV germicidal irradiation through an increase in velocity and a decrease in pressure within the efflux intake manifold, which creates fluid movement within the reservoir through a connected UV grade tube.

In some alternative embodiments, an increase in velocity and a decrease in pressure within the efflux intake manifold, allows introduction of an environmentally safe bactericidal and virucidal agent into the efflux intake manifold and vacuum efflux reservoir.

In some embodiments, the vacuum adapter assembly includes an external luer lock fitting which connects to the efflux intake manifold to allow introduction of an environmentally safe bactericidal and virucidal agent into the vacuum efflux reservoir without opening the unit, maximizing asepsis and reducing the potential spread of pathogenic material.

In some alternative embodiments, the method and system to improve asepsis during dental delivery may include a self-contained water delivery apparatus consisting of a reservoir made of an FDA compliant medical grade UV resistant polymer with a removable UVC LED light emitting unit.

In some embodiments, the invention attaches to and replaces existing self-contained water reservoirs, which have a single delivery feed tube, and one air input orifice.

In alternative embodiments, a reservoir egress connector provides an effective method for quick attachment, fluid agitation and unrestricted light transmission to provide germicidal irradiation.

In at least one alternative embodiment, the reservoir connector has an additional air tube extension disposed proximate to the water delivery tube, providing a method for agitation of the water column for germicidal sanitation upon exposure to UV irradiation.

In some embodiments, the air tube extension and water feed tube may be made of UV quartz or glass joined to the ports on the reservoir egress connector by short flexible extensions, facilitating reservoir attachment.

In alternative embodiments, pressure release is provided during water agitation. Agitation of the water column may occur during hand piece use, water syringe use, a manual purge switch or by connection to a power purge control box.

In some alternative embodiments, the invention is designed to be disassembled for complete cleaning with the use of biopharmaceutical sanitary gaskets and clamps.

In some embodiments, a closed case vacuum system will improve asepsis and will incorporate commercial non-spill connectors that pass through the exterior shell of the case providing connection to an oral evacuation tip and for connection to a vacuum pump. Isolation, and containment of the components and germicidal UVC LED light irradiation will limit the chance for the spread of pathogens.

In some embodiments, the invention may incorporate a vacuum efflux assembly, a removable and recyclable solids collection device, as well as a medical grade air vacuum filter.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

DETAILED DESCRIPTION OF THE PREFERRED EMBODIMENTS

The device and system to improve asepsis in dental apparatus is disclosed herein. In general, the device and system to improve asepsis in dental apparatus is indicated by the numeral 100.

Figure 1:
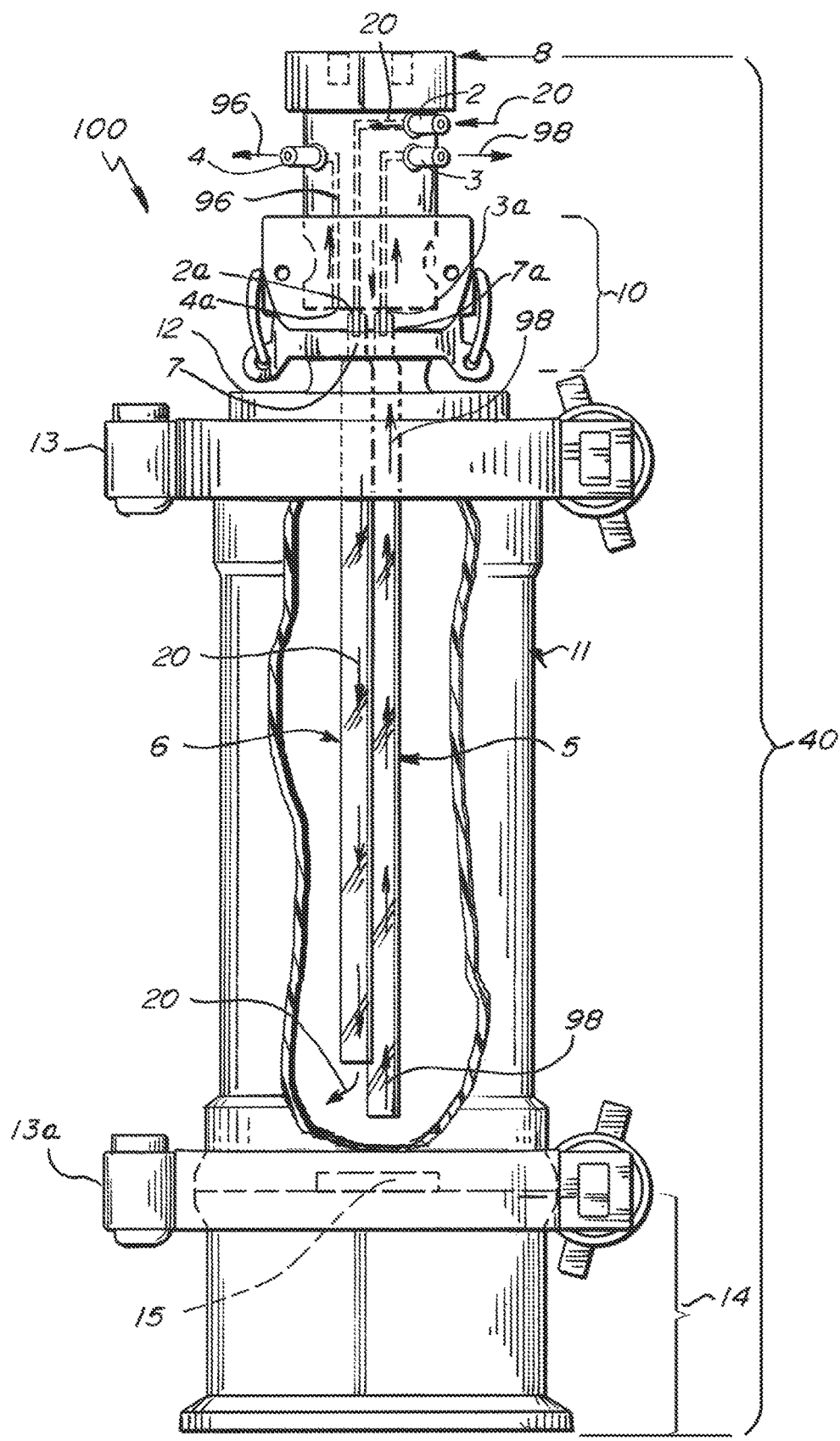
FIG. 1 is a side, partial phantom line, partial cut-away view of one alternative embodiment of a self-contained water delivery apparatus of the current invention.

In general, referring to FIG. 1, in at least one embodiment, the device and system to improve asepsis in dental apparatus 100 includes a self-contained water delivery apparatus 40 which includes a reservoir 11 made of an FDA compliant medical grade ultraviolet (UV) resistant polymer and a removable UVC light emitting diode (LED) light emitting unit 14, emitting light having an approximate wavelength of between 270 nm to 280 nm. In some embodiments, the reservoir egress connection assembly 8 provides fixed mounting within or near the dental delivery unit (not shown). In some embodiments, reservoir 11 is partially transparent, translucent, or is transparent and is formed of a material other than FDA compliant medical grade ultraviolet (UV) resistant polymer. In some embodiments, reservoir 11 is formed of glass, plastic, or other material which permits passage of light having a wavelength of between 270 nm and 280 nm there through. In other embodiments where the reservoir 11 is cylindrically tubular in shape having an open lower end, reservoir 11 may be formed of any material which is resistant to ultra-violet irradiation or reservoir 11 may be opaque. Examples of materials resistant to ultraviolet irradiation include but are not necessarily limited to polymers, metals, composite materials and combinations thereof.

In some embodiments, the reservoir 11 of the self-contained water delivery apparatus 40 may include a commercially available sanitary quick connection assembly 10 which is releasably secured to the reservoir 11 through the use of commercial sanitary clamps and gaskets 13. Alternatively, the quick connection assembly numeral 10 may be rotatably secured or screwed into a sanitary adapter 12. In some embodiments, the sanitary adapter 12 is releasably connected to the reservoir 11 through the use of gaskets and clamps 13.

In some embodiments, the self-contained water delivery apparatus 40 is joined to the reservoir egress connector assembly 8 through engagement to the quick connection assembly 10, which in turn may be affixed to a commercial sanitary adapter 12.

In some embodiments, the top of the reservoir 11 is generally open where a water tight, air tight, and a pressure tight seal is created between the top of the reservoir 11 and the bottom of the sanitary adapter 12 and connection assembly 10, by the tightening of the commercial sanitary gaskets and clamps 13. In at least one embodiment, the upper commercial sanitary clamp and gasket 13 enables the disassembly of the quick connector assembly 10 from the reservoir 11 for cleaning.

In some embodiments a lower commercial sanitary clamp and gasket 13a is used to secure the UVC LED light emitting unit 14 to a lower portion of the reservoir 11.

In at least one alternative embodiment, the self-contained water delivery apparatus 40 is not required to be connected to an outside water line. The independence of the self-contained water delivery apparatus 40 facilitates use in remote or field dentistry applications.

In alternative embodiments, available water may be introduced into the reservoir 11 from an outside faucet, stream, or other water source following the detachment of the reservoir 11 from the upper commercial sanitary clamp and gasket 13 and quick connector 10 or water may be introduced through quick connector 10 upon releasing the reservoir egress connector assembly 8.

In some embodiments, air from a regulated, pressurized air source from a dental compressor, provides pressurization to the water within the reservoir 11. The pressurized air enters into the reservoir egress connector assembly 8 through port 2 and exits the reservoir egress connector assembly 8 through port 2a. Pressurized air then passes through a flexible connector 7 into the upper portion of a UV grade tube 6. This pressurized air course is identified by reference numeral 20. In some embodiments, tube 6 is transparent and is formed of a material such as quartz. In some embodiments, tube 6 is formed of glass, plastic or other material which permits passage of light having a wavelength of between 270 nm and 280 nm there through.

In some embodiments, the process of air introduction and/or air movement in the reservoir 11, proximate to the bottom, or below the water column, provides agitation within the water column enhancing complete UV germicidal irradiation of the water column within the reservoir 11. In some embodiments, the water agitation within the reservoir 11 may also occur when air pressure is released from a purge valve through ports 4 and 4a. The pressure release air course is identified by reference numeral 96.

In some embodiments, port 4 may be connected to a manual purge valve or alternatively, to a custom purge/power control box 21, which in turn may provide time control functions to enable timed or preprogrammed agitation of the water column during UV irradiation from the UVC LED light emitting unit 14.

In at least one embodiment, the purge valve for the air supply may be oriented in a closed position. When pressurized air is introduced into the reservoir 11 through ports 2, 2A, and tube 6, (air course 20) pressure is exerted on the water column, which in turn will establish a fluid flow passage upwardly through a second UV grade tube 5, enabling water which has been purified following exposure to UV light from the UVCLED light emitting unit 14, to egress out of the reservoir 11 upon demand, which may occur when operating dental hand pieces or a water syringe during dental delivery. The fluid course from the reservoir 11 to port 3 is identified by reference numeral 98. In some embodiments, tube 5 is transparent and is formed of a material such as quartz. In some embodiments, tube 5 is formed of glass, plastic or other material which permits passage of light having a wavelength of between 270 nm and 280 nm there through.

The pressurization within the reservoir 11, forces purified water up tube 5, through a flexible connector 7a, and into port 3a and out of port 3 for distribution to dental hand pieces and/or a water syringe. (Fluid course 98)

In some embodiments, as purified water is expelled from the pressurized reservoir 11 during the use of dental hand pieces or a water syringe, air pressure within the reservoir 11 is maintained through the introduction of additional air into the reservoir 11 by the use of a regulated air source, which may be in air communication with port 2.

In at least one embodiment, additional air will flow down tube 6 as a dental hand piece or water syringe is used during a dental procedure. (Air course 20) As water from the reservoir 11 is used during the dental procedure agitation of the water column may also occur as a result of the entry of additional air down the UV quartz tube 6. The UVC LED light emitting unit 14 may continuously or periodically expose the water column in the reservoir 11 to UV germicidal irradiation.

In some embodiments the bottom portion of the reservoir 11 is generally open, and the reservoir 11 is generally cylindrically tubular in shape. In other embodiments, the bottom of the reservoir 11 may be closed and may include an integral or an affixed pressure sealed UV grade quartz window or bottom.

In some embodiments the UVC LED light emitting unit 14 may be releasably secured to the bottom portion of the reservoir 11 by the use of a lower sanitary clamp and gasket 13a. The lower sanitary clamp 13a enables the disassembly of the reservoir 11 from the UVC LED light emitting unit 14 for cleaning. In some embodiments, the UVC LED light emitting unit 14 includes a window 15 which is transparent, and which is formed of quartz or a material other than quartz. In some embodiments, window 15 is formed of glass, plastic or other material which permits passage of light having a wavelength of between 270 nm and 280 nm there through. In some embodiments, the bottom of the reservoir 11 does not include a window, however, the bottom of the reservoir 11 is open or closed, and in both embodiments the lower portion of the reservoir 11 permits light having a wavelength of between 270 nm and 280 nm to pass there through.

In some embodiments the light emitting diode light sources are disposed below the window 15, where the window 15 creates a water tight, air tight, and pressure tight seal preventing moisture or air exposure to the light emitting diode light sources of the UVC LED light emitting unit 14.

In some embodiments, a water tight, air tight, and pressure tight seal is established between the bottom portion of the reservoir 11 and the LED light emitting unit 14, upon the tightening of the lower clamp and gasket 13a.

In some embodiments, water agitation within the water column in the reservoir 11 may also occur by the release of pressure within the reservoir 11 by the opening of the purge valve. The opening of the purge valve enables pressurized air to escape through port 4a and then port 4. The release of pressure on the water column within the reservoir 11 causes the water within the reservoir 11 to agitate and mix facilitating germicidal purification and exposure to UV irradiation from the UVC LED light emitting unit 14.

Figures 2, 3:
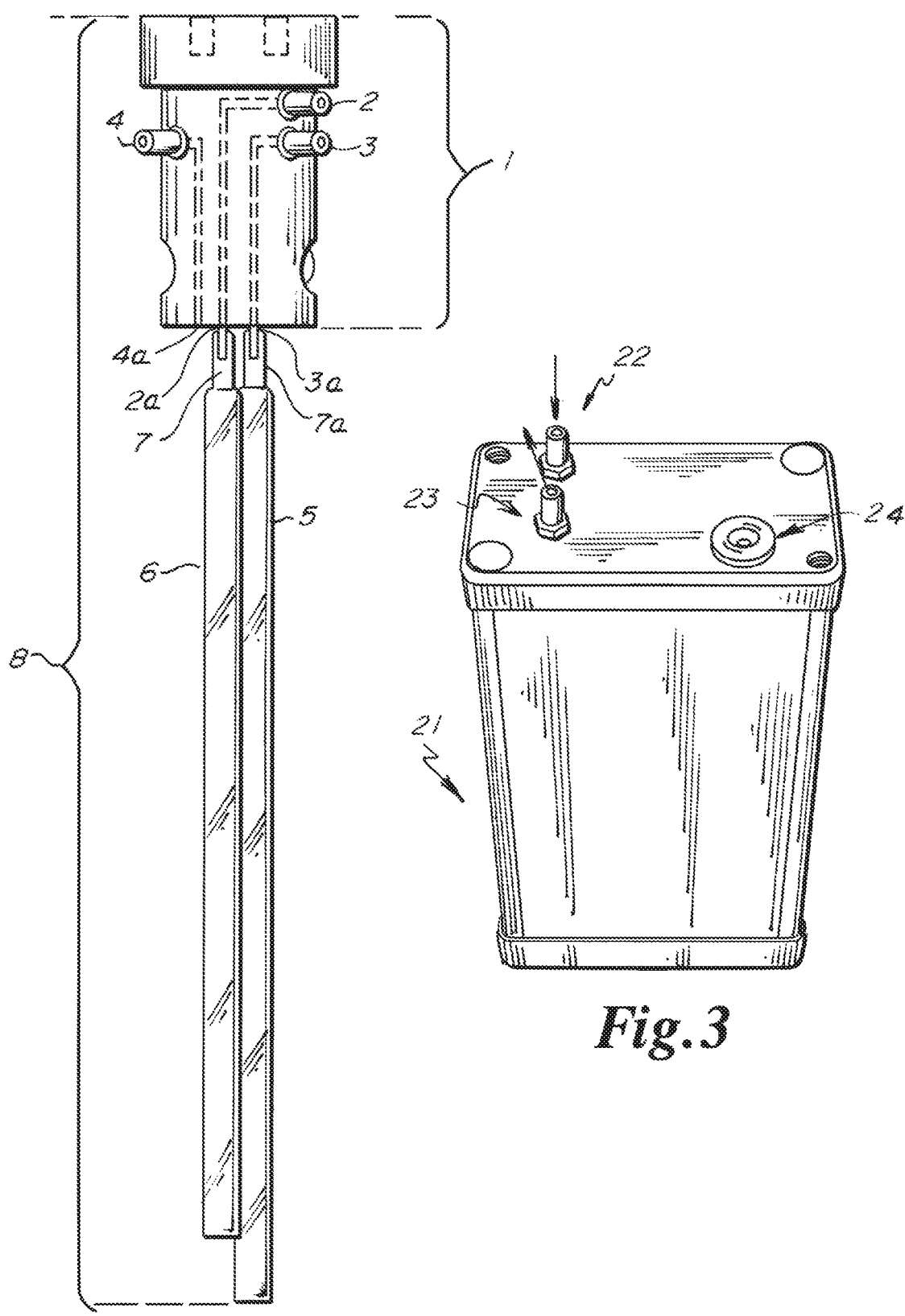
FIG. 2 is a detail side view of one alternative embodiment of a reservoir egress connector of the current invention.
FIG. 3 is a detail isometric view of one alternative embodiment of a purge power control box of the current invention.

In general, referring to FIG. 2, a reservoir egress connector assembly 8 is shown. In at least one embodiment the egress connector assembly 8 includes a head assembly 1. The head assembly 1 is formed of an FDA compliant medical grade UV resistant polymer. The head assembly 1 includes six ports, namely, ports 2, 2a, 3, 3a, 4, and 4a. In other embodiments, the reservoir egress connector assembly 8 may be constructed of metal, polymer, or other materials or combinations of materials provided that the features, functions, and/or attributes identified herein are not sacrificed.

In at least one embodiment, pressurized air enters through port 2 traversing a passage to port 2a. The pressurized air then passes through the flexible connector 7 and enters into tube 6 for entry into reservoir 11.

In at least one embodiment, UV irradiated and purified water leaves reservoir 11 by the entry into the bottom of the UV grade tube 5 traversing upwardly through flexible connector 7a and into port 3a. The purified water then passes through a conduit from port 3a to port 3 for exit and use in a dental hand piece or water syringe or other dental device.

In some embodiments, the use of flexible connectors 7 and 7a facilitates the ease of reservoir 11 attachment and release from the reservoir egress connector assembly 8 and/or the quick connection assembly 10.

In some embodiments, the use of the tubes 5 and 6 allows the complete irradiation of the interior reservoir contents without establishing shadowed or blocked areas which would occur if traditional tubing materials were utilized. In addition, the use of tubes 5 and 6 prevents the growth of pathogens within the interior of either of tubes 5 or 6.

In at least one embodiment as depicted in FIG. 3 a purge/power control box 21 is shown. The purge/power control box 21 provides both an external and internal DC power source to the device and system to improve asepsis in the dental apparatus 100.

In at least one embodiment, port 22 provides an incoming pneumatic connection from port 4 of the head assembly 1. Within the purge/power control box 21, port 22 is connected to a pneumatic electrical switch which is normally open. The pneumatic electrical switch activation is triggered by an established air pressure differential. When air pressure into port 22 is increased to the established level, the pneumatic electrical switch closes. The closing of the pneumatic electrical switch also completes an electric circuit with an internal time delay relay module which in some embodiments may be programmable. The internal time delay relay may also provide power to the UVC LED light emitting unit 14. The internal time delay relay may also provide electricity/power to a normally closed pneumatic air purge valve.

In some embodiments, when the pneumatic air purge valve is opened, pressure is released from the reservoir 11 through port 4a and then through port 4, for entry into port 22, which is in airflow communication with the pneumatic air purge valve for exit through pneumatic connection 23 into the atmosphere. This airflow course permits continued airflow through ports 2, 2a, flexible tube 7, as well as tube 6 when the pneumatic air purge valve is open. The continued air passage through tube 6 and ports 4a, 4, into port 22 provides agitation to the water column in reservoir 11, allowing for complete UV irradiation of the water column.

In some embodiments, the internal time delay relay module may be electrically connected to connector/source 24 which may be an external DC power lead, which may be used to provide a source of electricity for the UVC LED light emitting unit 14. In some embodiments connector/source 24 may be a commercial DC power lead jack.

In some embodiments when the pneumatic air purge valve is closed air will continue to enter into reservoir 11 through ports 2, 2a, flexible tube 7, and tube 6 to increase pressure within the reservoir 11. Once the air pressure within the reservoir 11 reaches an established threshold, the pneumatic electrical switch will be triggered, closing the circuit to the pneumatic purge valve to open the pneumatic purge valve to release pressure/air as previously described. When the air pressure drops to a preselected level the pneumatic electrical switch will open breaking the circuit to the pneumatic purge valve to close the pneumatic purge valve to allow pressure within the reservoir 11 to increase. In the closed operational position air is not permitted to pass through the pneumatic purge valve, which in turn increases air pressure within the conduits between ports 22, 4, 4a and within reservoir 11.

Figure 4:
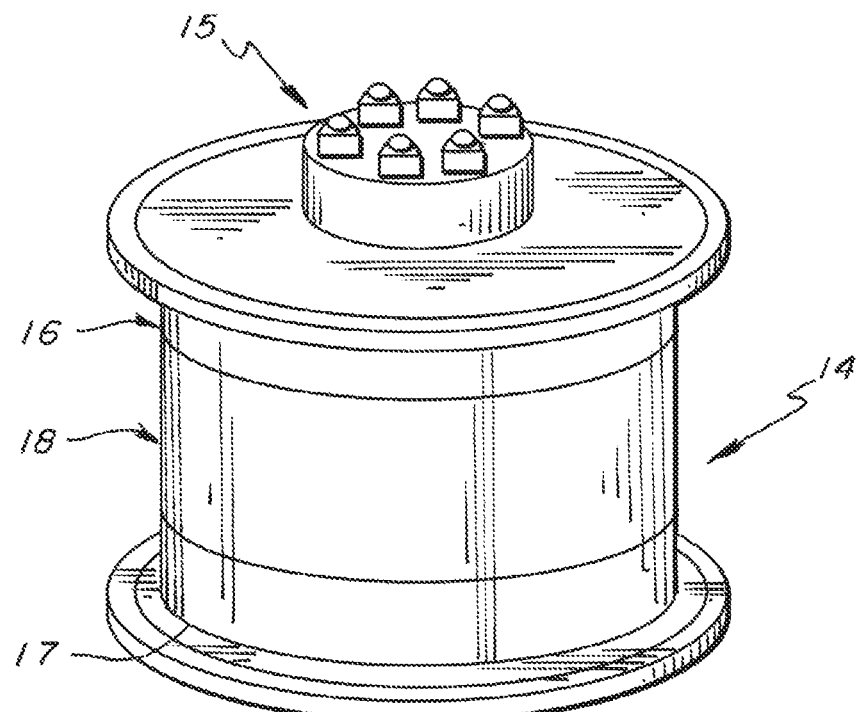
FIG. 4 is a detail isometric view of one alternative embodiment of a light emitting diode light unit of the current invention.

In at least one embodiment, as depicted in FIG. 4, the UVC LED light emitting unit 14 is shown. The UVC LED light emitting unit 14 has a light source body 18 which houses a UVC LED light source which provides UV light having a wavelength in the range of 270 nm to 280 nm. The UVC LED light emitting unit 14 may be mounted on top of a heat sink. Power may be supplied to the UVC LED light emitting unit 14 through an internal ultracapacitor or battery. The light source body 18 in some embodiments may be a housing constructed of metal, polymer, or other materials or combinations of materials provided that the features, functions, and/or attributes identified herein are not sacrificed.

In some embodiments, the UVC LED light emitting unit 14 may have a symmetrical upper assembly 16 and lower assembly 17. In at least one embodiment, the upper assembly 16 has a pressure sealed window 15 which permits germicidal UV light transmission from the UVC LED light emitting unit 14 for exposure to the water column in the reservoir 11.

In some embodiments, window 15 may be located to the interior of fasteners. The fasteners may be used to attach and to create an air and liquid seal between the window 15 and the upper assembly 16. As depicted in FIG. 4, six fasteners are shown. In some embodiments, the upper assembly 16 will include a centrally disposed circular shaped pocket which is constructed and arranged to receive an LED light emitting unit. Adjacent to the pocket may be a plurality of apertures. A window 15 may be disposed over the pocket. A collar including a gasket may be disposed under or over the window 15. The collar includes collar apertures which are aligned with the apertures adjacent to the pocket. Fasteners may then be placed through the collar apertures and the apertures adjacent to the pocket to affix the collar and window 15 to the upper assembly 16, creating the airtight and watertight seal there between, which in turn protects the LED light sources. This configuration may also facilitate replacement of the LED light sources if required.

In some embodiments, the lower assembly 17 houses a DC power input adapter which permits intermittent or continuous power to be supplied to the LED light sources of the UVC LED light emitting unit 14.

In some embodiments, the design of the symmetrical upper assembly 16 and lower assembly 17 facilitates the connection of the UVC LED light emitting assembly 14 to the reservoir body 11 as well as the connection to the base mount assembly 32.

Figure 5:
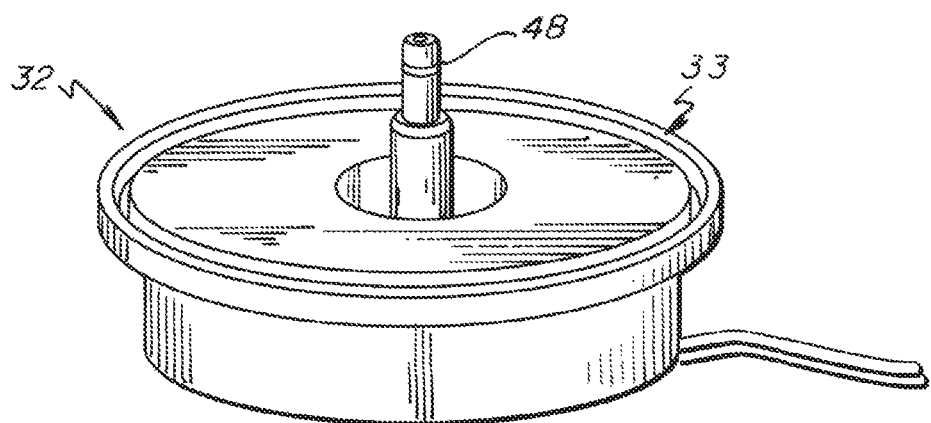
FIG. 5 is a detail isometric view of one alternative embodiment of a case base mount assembly of the current invention.

In at least one alternative embodiment as depicted in FIG. 5, a case base mount assembly 32 is shown. The case base mount assembly 32 provides a mounting surface for the UVC LED light emitting unit 14 when the UVC LED light emitting unit 14 is being used within either a portable dental delivery case 44 or a portable vacuum unit case 46. The UVC LED light emitting unit 14 may be releasably connected to the case base mount assembly 32 through the use of the lower commercial sanitary gasket and clamps 13a as earlier described.

In some embodiments, the UVC LED light emitting unit 14 may be removed from the reservoir body 11 or vacuum efflux reservoir 38 for attachment to the case base mount assembly 32. The UVC LED light emitting unit 14 and the case base mount assembly 32 may then be releasably attached to the bottom, or at any desired location, within the interior of either the portable delivery case 44 or portable vacuum case 46. The UVC LED light emitting unit 14 as releasably engaged within either the portable delivery case 44 or the portable vacuum case 46 will emit germicidal UV light to expose the interior of the portable delivery case 44 or the portable vacuum case 46, to reduce bacterial and/or pathogenic contamination within the interior of the respective case upon closure.

In at least one embodiment, the case base mount assembly 32 includes a base mount 33 and a switched power feed which may be triggered upon closure of either the portable delivery case 44 or the portable vacuum case 46. In some embodiments the base mount 33 may be constructed of metallic material or polymers or other suitable material or combinations thereof provided that the essential features, functions, and/or attributes as described herein are not sacrificed.

In some embodiments, the case base mount assembly 32 includes a centrally disposed electrical penetrating connector 48 which may be a DC power adapter. The electrical penetrating connector 48 may be electrically connected to a receiving DC power adapter which may be located on the bottom side of the UVC LED light emitting unit 14.

Figure 6:
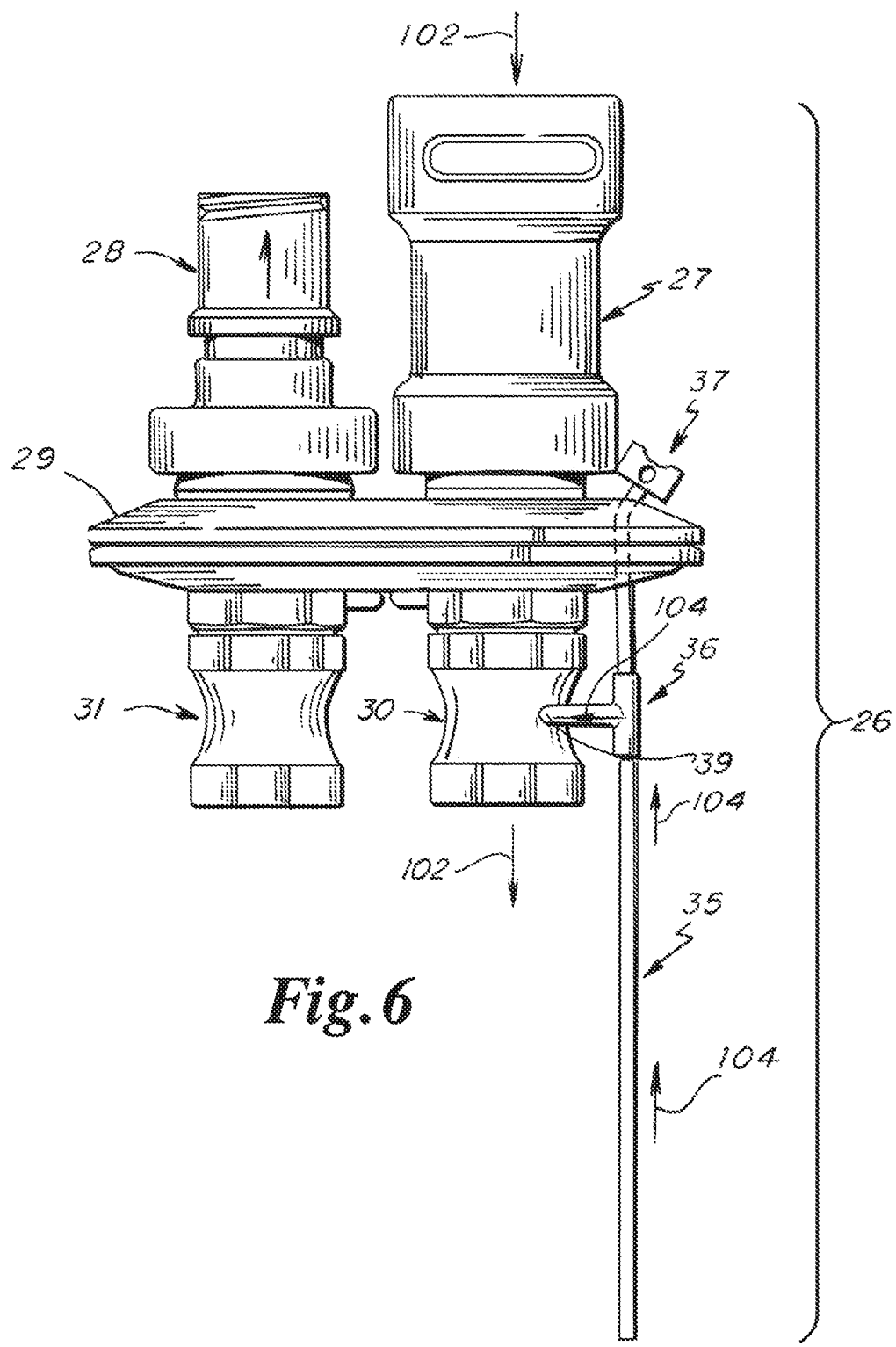
FIG. 6 is a detail side view of one alternative embodiment of a vacuum adapter assembly of the current invention.
Figure 7:
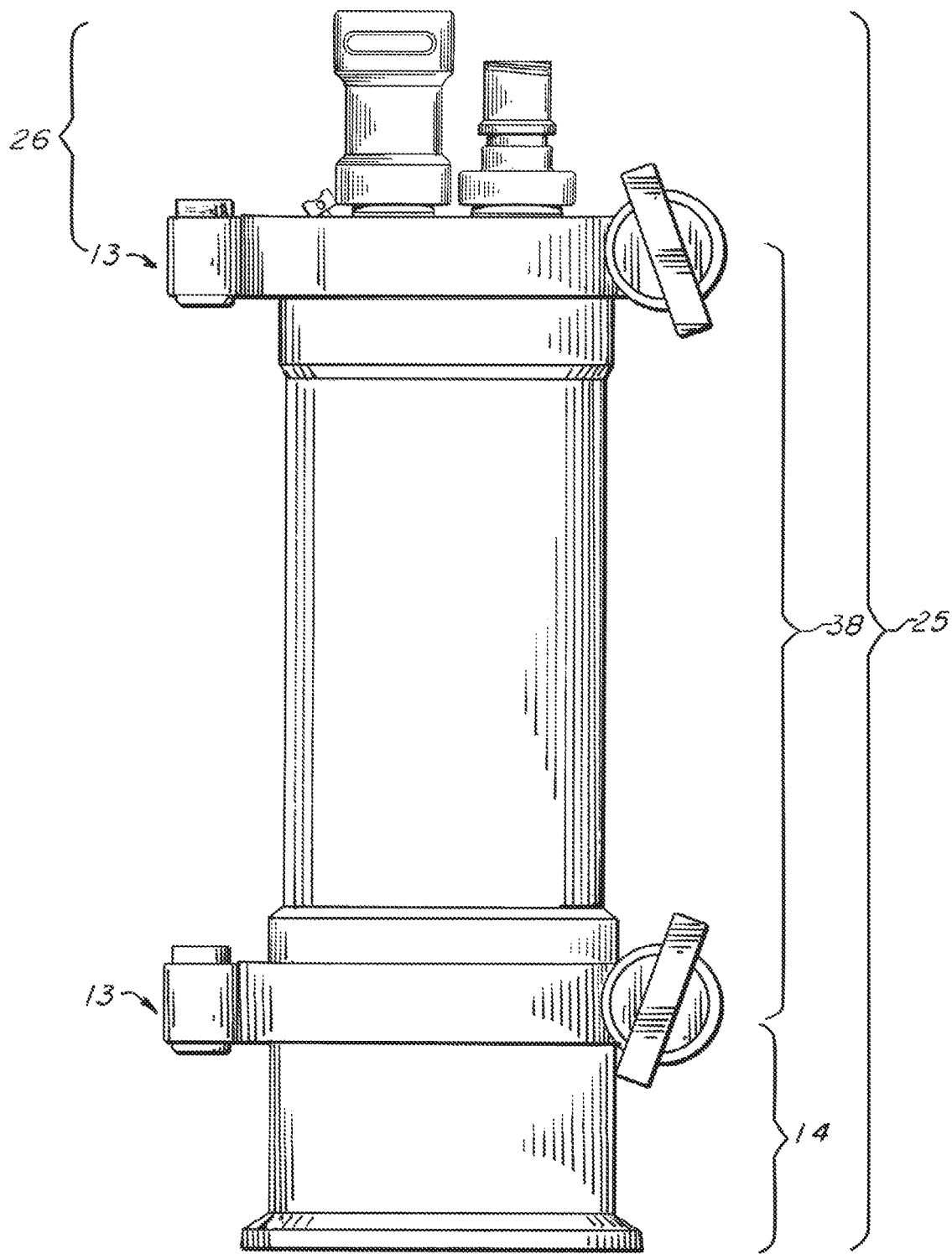
FIG. 7 is a detail side view of one alternative embodiment of a vacuum efflux assembly of the current invention.

In at least one embodiment as depicted in FIGS. 6 and 7 a vacuum adapter assembly 26 is shown. The vacuum adapter assembly 26 may include a commercial penetrating medical grade non-spill input connector 27 and a commercial receiving medical grade non-spill output connector 28.

Both the input connector 27 and the output connector 28 may be integrated within a vacuum reservoir cap 29. The vacuum reservoir cap 29 may be made of a UV resistant biopharmaceutical grade material. The vacuum reservoir cap 29 may also be constructed of metallic material or polymers or other suitable material or combinations thereof provided that the essential features, functions, and/or attributes as described herein are not sacrificed.

In at least one embodiment, the input connector 27 will be in communication with an efflux intake manifold 30. The efflux intake manifold 30 may direct evacuated liquids into the vacuum efflux reservoir 38 and provide agitation within the vacuum efflux reservoir 38. The fluid flow course into the input connector 27 and vacuum efflux reservoir 38 is identified by reference numeral 102.

In some embodiments the efflux intake manifold 30 has an internal neck down configuration which provides a venturi effect drawing vacuum at a pneumatic connector 39. In at least one embodiment air/fluid will enter the vacuum adapter assembly 26 at the top or proximate to the input connector 27. As the incoming air and fluid volume is constricted in the neck down configuration of the efflux intake manifold 30, the speed of the air/fluid will increase in velocity causing a pressure decrease proximate to the pneumatic connector 39, pulling fluid upwardly from the vacuum efflux reservoir 38 into the efflux intake manifold 30. Fluid is pulled from the vacuum efflux reservoir 38 into a UV grade tube 35 which extends downwardly from the pneumatic connector 39 towards the bottom portion of the efflux reservoir 38. This fluid flow course in the UV grade tube 35 is depicted by reference numeral 104. In some embodiments, tube 35 is transparent and is formed of quartz or a material other than quartz. In some embodiments, tube 35 is formed of glass, plastic or other material which permits passage of light having a wavelength of between 270 nm and 280 nm there through.

The resulting fluid movement provides agitation within the vacuum efflux reservoir 38 for complete UV germicidal irradiation from a UVC LED light emitting unit 14. In some embodiments, the tube 35 may be joined to the efflux intake manifold 30 by a flexible connector to a T-connector 36.

In at least one embodiment, the T-connector 36 is connected to flexible tubing to an external luer lock fitting 37. The luer lock fitting 37 provides a port for syringe injection of an environmentally safe bacterial and virucidal agent, through the efflux intake manifold 30 and into the vacuum efflux reservoir 38 prior to vacuum shutdown in order to improve asepsis.

In some embodiments the output connector 28 is in communication with the vacuum intake manifold 31. The output connector 28 may also provide a connection to a vacuum source.

In some embodiments, the vacuum intake manifold 31 may include a float stop valve and may include a commercial grade sanitary fitting.

In at least one embodiment as depicted in FIG. 7 the vacuum efflux assembly 25 includes a UVC LED light emitting unit 14 and a vacuum efflux reservoir 38. The vacuum efflux reservoir 38 may be formed of a UV resistant biopharmaceutical grade material. The vacuum efflux assembly 25 also includes a vacuum adapter assembly 26. Attachment and disassembly of the vacuum efflux reservoir 38 from the vacuum efflux assembly 25 may be provided by the use of two commercial sanitary gasket and clamps 13. In some embodiments, vacuum efflux reservoir 38 is partially transparent, translucent, or is transparent and is formed of a material other than UV resistant biopharmaceutical grade material. In some embodiments, vacuum efflux reservoir 38 is formed of glass, plastic or other material which permits passage of light having a wavelength of between 270 nm and 280 nm there through. In other embodiments where the vacuum efflux reservoir 38 is cylindrically tubular in shape having an open lower end, vacuum efflux reservoir 38 may be formed of any material which is resistant to ultra-violet irradiation or vacuum efflux reservoir 38 may be opaque. Examples of materials resistant to ultra-violet irradiation include but are not necessarily limited to polymers, metals, composite materials and combinations thereof.

In some embodiments the bottom portion of the vacuum efflux reservoir 38 is generally open, and the vacuum efflux reservoir 38 is generally cylindrically tubular in shape. In other embodiments, the bottom of the vacuum efflux reservoir 38 may be closed and may include an integral or an affixed pressure sealed UV grade quartz window or bottom. In some embodiments, the bottom portion of the vacuum efflux reservoir 38 may be open, transparent, translucent, or partially transparent permitting passage of light having a wavelength of between 270 nm and 280 nm there through.

Figure 8:
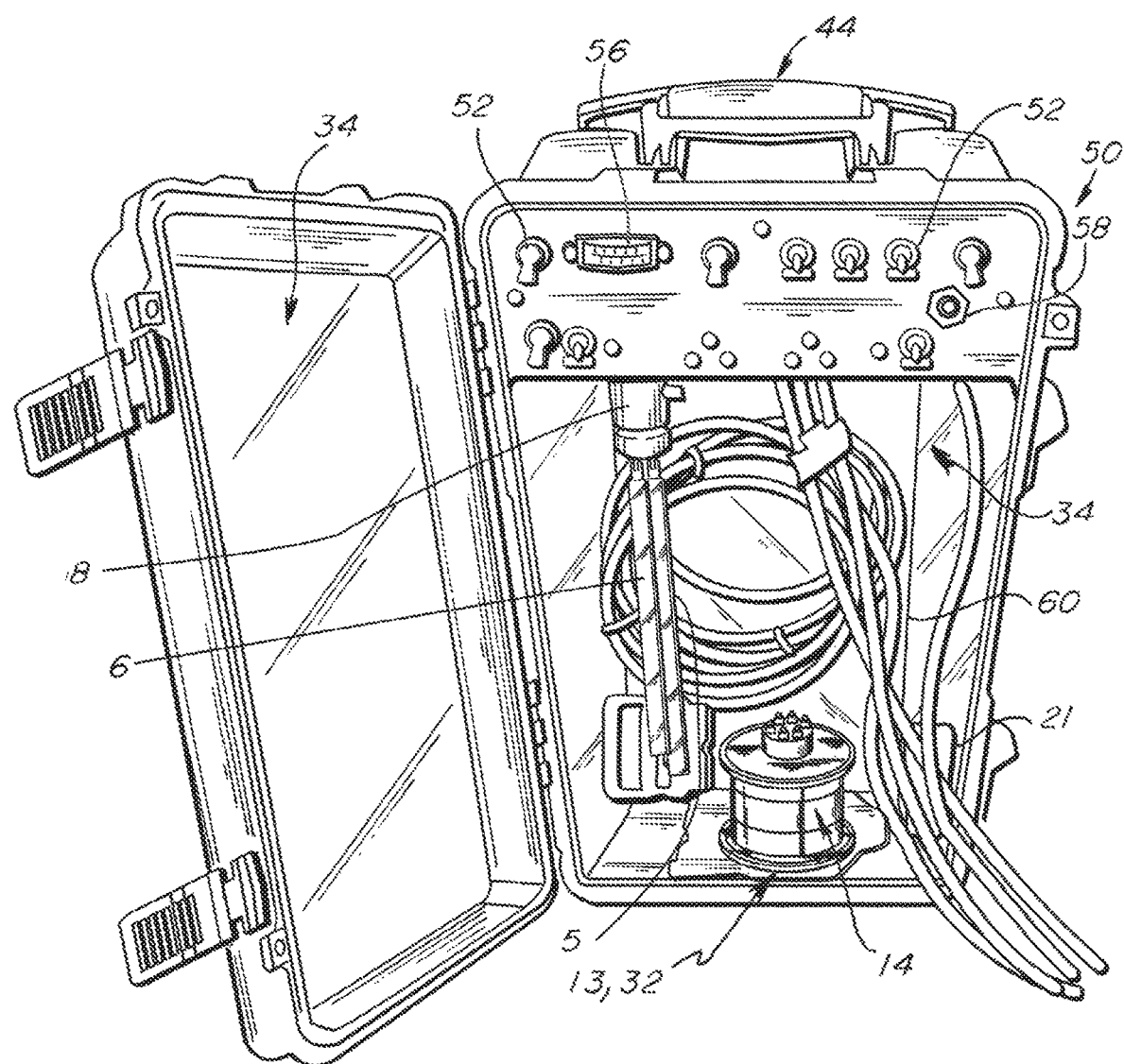
FIG. 8 is an environmental view of one alternative embodiment of a case in an open configuration transporting one embodiment of the current invention.

In some embodiments as depicted in FIG. 8 a portable dental delivery unit case 50 is shown. In the portable dental delivery unit case 50, a UVC LED light emitting unit 14 is releasably connected to the bottom of the case by a base mount assembly 32 and a commercial sanitary clamp and gasket 13. As shown in FIG. 8, a reservoir egress connector assembly 8 may be mounted to the top of the case, for positioning proximate to a dental delivery unit.

In one embodiment, a purge/power control box 21 may be mounted to the interior of the portable dental delivery unit case 50, proximate to a bottom and/or side wall, or alternatively positioned proximate to a fixed dental delivery unit.

In some embodiments the inside surface of the portable dental delivery unit case 50 will be lined with a reflective layer or coating 34 to assist in the maximization of germicidal UV radiation exposure within the case interior, which in turn minimizes bacterial and pathogenic contamination within the interior of the case upon case closure.

In at least one embodiment, the reservoir 11 may be removed from the interior of the portable dental delivery unit case 50 during UV irradiation within the interior of the case.

In some embodiments, the portable dental delivery unit case 50 includes hand piece controls 52 to regulate air and water, and air source connection, a flush valve, and air on/off switch with indicator, and air pressure gauge 56, and/or a separate on/off air switch connected to a compressed air plug-in 58 by way of a separate air regulator.

In some embodiments, hand piece tubing 60 and hangers are attachable to the handle of the portable dental delivery unit case 50. Tubing may be disposed in coils within the interior of the case for exposure to UV irradiation.

Figure 9:
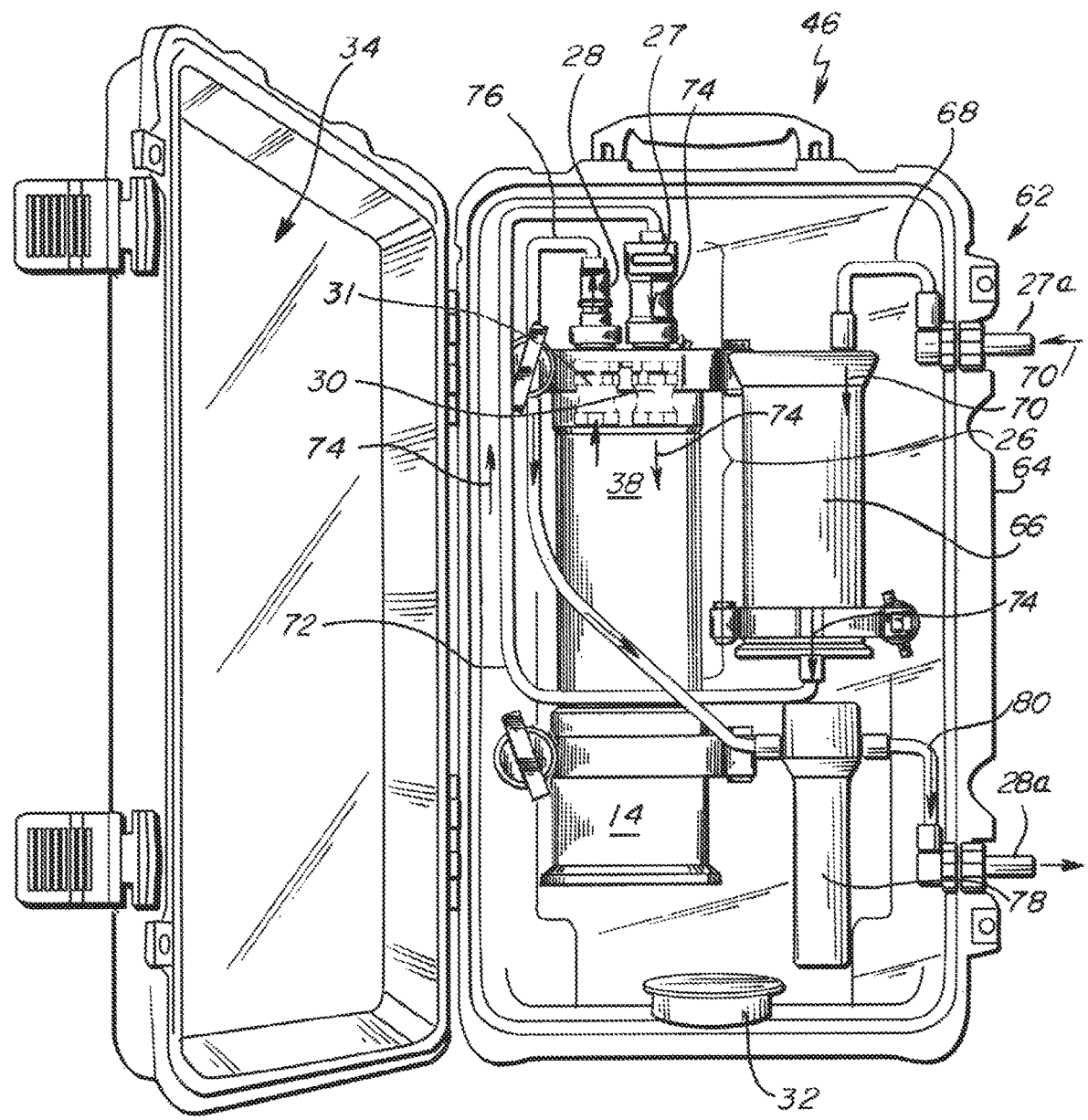
FIG. 9 is an environmental view of one alternative embodiment of a case in an open configuration transporting one embodiment of the vacuum efflux assembly current invention.

In some embodiments, as depicted in FIG. 9, a portable dental vacuum unit 62 is shown. The portable dental vacuum unit 62 demonstrates component integration and a system to properly handle biohazards and prevent the spread of pathogens during use of the device and system to improve asepsis in dental apparatus 100.

In some embodiments, the portable dental vacuum unit 62 includes a commercial medical grade non-spill connector 27a which traverses the exterior shell of the case 64 providing an outside connection to an oral evacuation ejector or an HVE tip by way of aseptic tubing. Connection of an HVE tip to the connector 27a allows oral evacuation of saliva, blood, water, and/or dental debris during the performance of dental procedures.

In some embodiments a removable and recyclable solids collector 66 is disposed within the interior of the case 64 and is in fluid flow communication with the input connector 27a through the use of aseptic tubing 68. Water and/or dental debris may enter into the connector 27a, through the aseptic tubing 68 and into the solids collector 66 is depicted by arrow 70.

In some embodiments the saliva, blood, water and/or dental debris (fluid efflux) will pass from the solids collector 66 passing into the vacuum efflux assembly 25 (FIG. 7) through a commercial medical grade aseptic tubing 72, as depicted by arrows 74, into a commercial medical grade non-spill input connector 27 for passing for collection in the vacuum efflux reservoir 38.

In some embodiments, the UVC LED light emitting unit 14 is attached to the bottom of the vacuum efflux reservoir 38. The UVC LED light emitting unit 14 provides germicidal irradiation through the lower portion of the vacuum efflux reservoir 38 to sterilize pathogens generated during an oral evacuation dental procedure. In at least one embodiment, the vacuum efflux reservoir 38 is substantially cylindrically tubular in shape and is connected to the UVC LED light emitting unit 14 by gaskets and clamps 13 which in turn form an air tight and fluid tight seal preventing leakage between the UVC LED light emitting unit 14 and the vacuum efflux reservoir 38. In this embodiment, the LED light sources are below a window 15 which is sealed preventing exposure of the LED light sources to fluids or air. In other embodiments, the lower portion or base of the vacuum efflux reservoir 38 may include a window.

In some embodiments, a commercial grade non-spill output connector 28 is in communication with the top of the vacuum efflux reservoir 38. Aseptic tubing 76 is preferably engaged to the output connector 28. The aseptic tubing 76 in some embodiments extends between the output connector 28 and a medical grade vacuum filter 78.

In at least one embodiment, any surviving airborne pathogens which traverse the output connector 28 from the vacuum efflux reservoir 38 are trapped and removed by the medical grade vacuum filter 78, which in turn functions to filter and remove any remaining pathogens and/or residual fluids.

Figure 10:
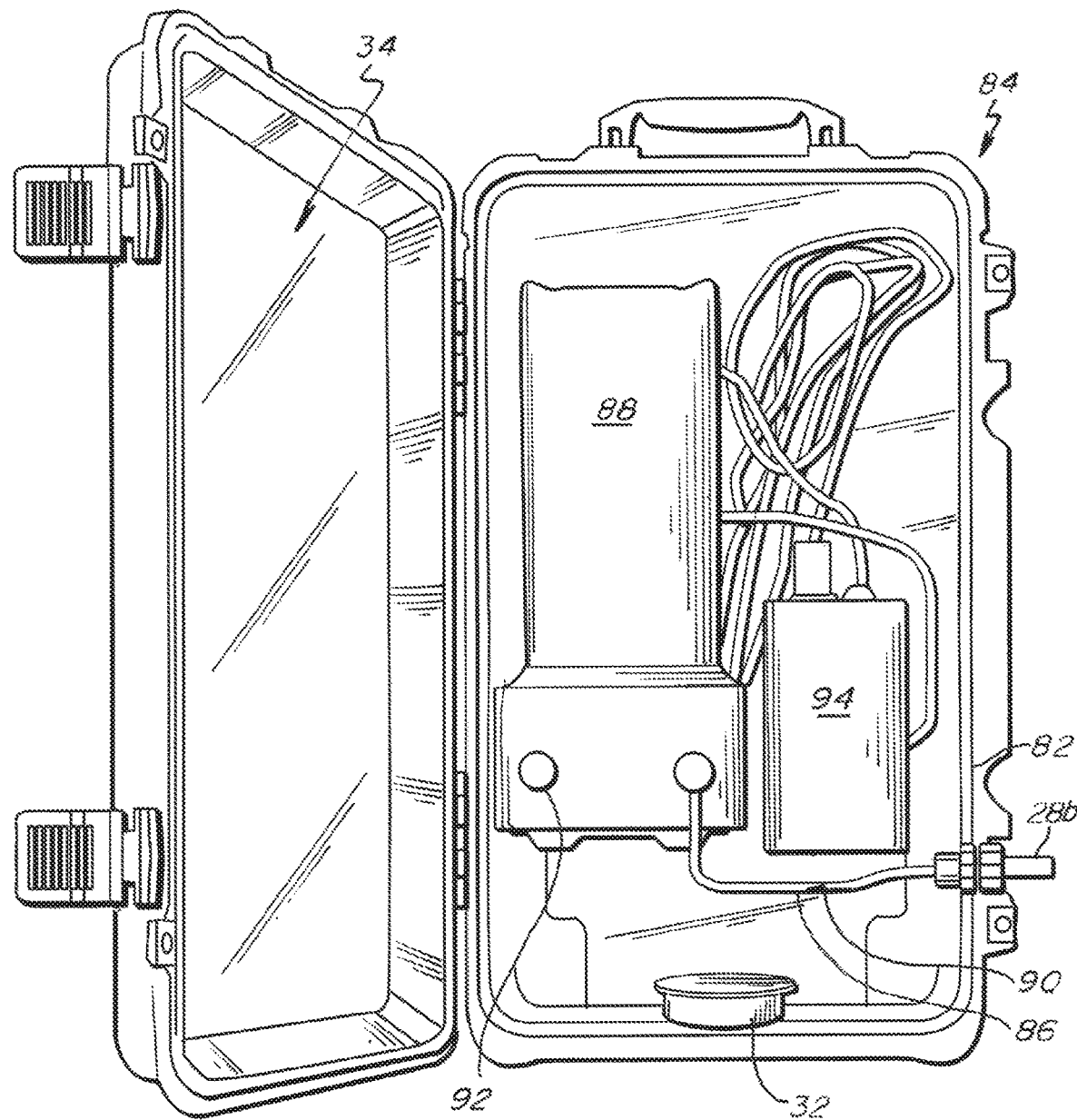
FIG. 10 is an environmental view of one alternative embodiment of a case in an open configuration transporting one embodiment of the current invention.

In some embodiments, the commercial medical grade vacuum filter 78 is in communication with an external vacuum source 84, one embodiment of which is depicted in FIG. 10. Aseptic tubing 80 may be used to connect the medical grade vacuum filter 78 to a commercial non-spill connector 28a which traverses the case 64. In some embodiments, tubing may extend between the non-spill connector 28a and port 28b of the external vacuum source 84.

In some embodiments the case base mount assembly 32 as earlier described for the UVC LED light emitting unit 14 may be utilized to releasably mount the UVC LED light emitting unit 14 within the bottom of the interior of the portable vacuum dental unit 62. The interior of the case 64 for the portable vacuum dental unit 62 may also include a reflective liner 34 to facilitate germicidal and pathogen sterilization. The reflective liner 34 improves irradiation of the integrated components upon closure of the case 64.

In some embodiments, the portable vacuum dental unit 62 may be used during dental procedures with the case 64 closed. In this embodiment, an outside indicator light proximate to one or more hand piece controls 52, may be used to verify the provision of power to the UVC LED light emitting units 14.

In some embodiments, as depicted in FIG. 10 external vacuum source 84 is shown. The external vacuum source 84 may be included as an integrated component within a portable vacuum pump case 82. The case base mount assembly 32 as earlier described for the UVC LED light emitting unit 14 may be utilized to releasably mount the UVC LED light emitting unit 14 within the bottom of the interior of the portable vacuum pump case 82.

In some embodiments, the interior of the vacuum pump case 82 may also include a reflective liner 34 to facilitate germicidal and pathogen sterilization. The reflective liner 34 improves irradiation of the integrated components of the vacuum pump case 82 upon closure.

In some embodiments, a commercial medical grade non-spill adapter 28b traverses the exterior wall of the vacuum pump case 82. The adapter 28b may be connected by aseptic tubing 86 to a rotary vane vacuum pump 88. Air will flow from the adapter 28b within tubing 86 to vacuum pump 88 in the direction of arrow 90. Air may exit vacuum pump 88 through muffler 92. The exhaust air exiting muffler 92 is free of pathogens when the components of FIG. 9 are irradiated with UV light from the UVC LED light emitting unit 14.

In some embodiments, a removable on/off foot switch 94 may be removed from the vacuum pump case 82 for activation of the vacuum pump 88 during a dental procedure.

In a first alternative embodiment, a method and system device to improve asepsis during dental delivery is disclosed, the method and system device comprising a self-contained water delivery apparatus which is constructed and arranged to replace existing self-contained water bottle delivery systems; and a vacuum apparatus, where the system device improves the handling of biohazards generated during dental procedures.

In a second alternative embodiment according to the first alternative embodiment, the method and system device further comprises a reservoir egress connector 8, an open ended reservoir body 11 made of an FDA compliant medical grade UV resistant material, and a UVC LED light emitting unit 14.

In a third alternative embodiment according to the second alternative embodiment, the reservoir egress connector is composed of an FDA compliant medical grade UV resistant material, having six ports, where ports 2, 2a provide an incoming air source air, ports 3, 3a provide purified water outflow, and ports 4, 4a support a pressure release function.

In a fourth alternative embodiment according to the third alternative embodiment, the reservoir egress connector comprises two flexible connectors that unite two UV grade tubes 5, 6 which extend into the reservoir body 11. The first UV transparent tube not being disposed within the interior of the second UV transparent tube within the reservoir and the second UV transparent tube not being disposed within the interior of the first UV transparent tube within the reservoir. The second UV transparent tube extending below the first UV transparent tube within the reservoir.

In a fifth alternative embodiment according to the fourth alternative embodiment, the reservoir egress connector 8 has a tube 6 extending into the reservoir body 11 which provides agitation of the water column which promotes complete UV germicidal irradiation within the water column.

In a sixth alternative embodiment according to any of the first through fifth alternative embodiments, agitation of the water column can occur during hand piece use, water syringe use, a manual purge switch connected to port 4, or by connecting port 4 to a power purge control box 21.

In a seventh alternative embodiment according to any of the first through sixth alternative embodiments, port 4 of the reservoir egress connector can be connected by an airline to the power purge control box 21, and the power purge control box may house an air activated electric switch, a normally closed air purge valve, a programmable timer module, and power input and power output adaptors. In the seventh alternative embodiment air pressure, upon turning on the unit, activates the air electric switch and starts the programmable timer which powers and opens the purge valve for 60 seconds. The air purge valve remains open for an initial period of 60 seconds as power is supplied to the UVC LED light emitting unit 14 allowing necessary agitation of the water within the reservoir body and UVC light emission to completely irradiate the water column.

In an eighth alternative embodiment according to any of the first through seventh alternative embodiments, the UVC LED light emitting unit 14 is comprised of a light source body that houses a UVC LED source emitting light having a wavelength in the range of approximately 270 nm to 280 nm, a heat sink and an internal ultracapacitor or rechargeable battery. The UVC LED light source unit has symmetrical upper and lower assemblies 16 and 17, the upper assembly has a UV grade quartz window. The lower assembly houses a penetrating external DC power adaptor.

In a ninth alternative embodiment according to any of the first through eighth alternative embodiments, the symmetrical upper and lower assemblies described in the sixth alternative embodiment allows connection of the UVC LED light emitting assembly to the reservoir body 11 as well as connection to a base mount assembly 32.

In a tenth alternative embodiment according to any of the first through ninth alternative embodiments, the base mount assembly 32 described in the ninth embodiment is designed for installation into portable dental delivery cases 44 and portable dental delivery vacuum units 46. The UVC LED light emitting unit 14 may be removed from the reservoir body 11 or vacuum efflux reservoir 38 and attached to the case base mount assembly 32 to provide germicidal UV light exposure into the case interior, reducing bacterial and pathogenic contamination within the case upon closure.

In an eleventh alternative embodiment according to any of the first through tenth alternative embodiments, the UVC LED light emitting unit 14 is used in accordance with the method, device, or assembly described in tenth alternative embodiment where a case interior has a reflective liner 34 which aids in distribution of germicidal light within the case upon closure.

In a twelfth alternative embodiment according to any of the first through eleventh alternative embodiments, the UVC LED light emitting unit 14 is used in accordance with the method, device or assembly described in the tenth alternative embodiment, where germicidal UV light exposure into the case interior provides a reduction in the potential for mold formation during storage.

In a thirteenth alternative embodiment according to any of the first through twelfth alternative embodiments, the symmetrical assemblies of the eighth alternative embodiment also allows attachment of the UVC LED light emitting unit 14 to provide germicidal irradiation of a vacuum efflux reservoir 38 to purify biohazards generated during dental procedures.

In a fourteenth alternative embodiment according to any of the first through thirteenth alternative embodiments, the vacuum apparatus of first alternative embodiment is comprised of a vacuum efflux assembly 25 that has a UVC LED light emitting unit 14 and is uniquely suited for use in a nursing home or outreach dental setting, with the incorporation of commercial non-spill input and output connectors 27, 28 that attach to the vacuum efflux reservoir 38 by a vacuum reservoir cap 29.

In a fifteenth alternative embodiment according to any of the first through fourteenth alternative embodiments, the vacuum efflux assembly 25 may be case mounted for portability with the unique ability to operate closed, with the incorporation of commercial medical grade non-spill input and output connectors 27*a*, 28*a* that pass through the exterior shell of the case.

In a sixteenth alternative embodiment according to any of the first through fifteenth alternative embodiments, the vacuum efflux assembly 25 when mounted within a case may be preceded by and connected to a removable and recyclable solids collector 66 and followed by a medical grade vacuum filter 78 prior to exiting the case via a non-spill connector 28*a*.

In a seventeenth alternative embodiment according to any of the first through sixteenth alternative embodiments, the UVC LED light emitting unit 14 is used in accordance with tenth alternative embodiment, the additional components in the fifteenth alternative embodiment may be handled with at a reduced risk of spreading bacteria and pathogens.

In an eightieth alternative embodiment according to any of the first through seventeenth alternative embodiments, a reflective liner on the interior shell of the case improves UVC LED irradiation of the case contents.

In an ninetieth alternative embodiment according to any of the first through eightieth alternative embodiments, the vacuum adapter assembly 26 provides agitation of the fluid efflux for complete UV germicidal irradiation through an increase in velocity and a decrease in pressure within the efflux intake manifold 30, which creates fluid movement within the reservoir 38 through a connected UV grade tube 35.

In a twentieth alternative embodiment according to any of the first through ninetieth alternative embodiments, an increase in velocity and a decrease in pressure within the efflux intake manifold 30, allows introduction of an environmentally safe bactericidal and virucidal agent into the efflux intake manifold 30 and vacuum efflux reservoir 38.

In a twenty-first alternative embodiment according to any of the first through twentieth alternative embodiments, the vacuum adapter assembly 26 has an external luer lock fitting 37 which connects to the efflux intake manifold 30 to allow introduction of an environmentally safe bactericidal and virucidal agent into the vacuum efflux reservoir 38 without opening the unit, maximizing asepsis and reducing the potential spread of pathogenic material.

In a twenty-second alternative embodiment, a device to improve asepsis during dental delivery is disclosed, the device comprising: a self-contained water delivery apparatus comprising a light emitting diode light unit emitting light having a wavelength between 270 nm and 280 nm; a reservoir positioned above and engaged to the light emitting diode light unit, the reservoir comprising an interior, the light passing into the interior; and a reservoir egress assembly, the reservoir egress assembly being engaged to the reservoir opposite to the light emitting diode light unit, the reservoir egress assembly comprising an air conduit and a fluid conduit, the air conduit comprising a first transparent tube disposed in the interior, and the fluid conduit comprising a second transparent tube disposed in the interior.

In a twenty-third alternative embodiment according to any of the first through twenty-second alternative embodiments, the light emitting diode light unit comprises a base mount assembly.

In a twenty-fourth alternative embodiment according to any of the first through twenty-third alternative embodiments, the light emitting diode light unit is releasably engaged to the reservoir.

In a twenty-fifth alternative embodiment according to any of the first through twenty-fourth alternative embodiments, the device further comprises a vacuum efflux assembly.

In a twenty-sixth alternative embodiment according to any of the first through twenty-fifth alternative embodiments, the vacuum efflux assembly comprises a second light emitting diode light unit emitting light having a wavelength between 270 nm and 280 nm; a vacuum efflux reservoir positioned above and engaged to the second light emitting diode light unit, the vacuum efflux reservoir comprising a vacuum efflux reservoir interior, light from the second light emitting diode light unit entering into the vacuum efflux reservoir interior; and a vacuum adapter assembly, the vacuum adapter assembly being engaged to the vacuum efflux reservoir opposite to the second light emitting diode light unit, the vacuum efflux assembly comprising an air passage and a fluid passage, the air passage comprising a vacuum intake manifold in communication with the vacuum efflux reservoir interior, and the fluid passage comprising an efflux intake manifold in communication with the vacuum efflux reservoir interior.

In a twenty-seventh alternative embodiment according to any of the first through twenty-sixth alternative embodiments, the efflux intake manifold comprises a pneumatic connector and a shape, the shape constructed and arranged to create a venturi suction effect at the pneumatic connector.

In a twenty-eighth alternative embodiment according to any of the first through twenty-seventh alternative embodiments, the efflux intake manifold further comprises a transparent UV grade tube in communication with the pneumatic connector.

In a twenty-ninth alternative embodiment according to any of the first through twenty-eighth alternative embodiments, the reservoir egress assembly further comprises an air input port, and air output port, a fluid input port, a fluid output port, a purge input port, and a purge output port.

In a thirtieth alternative embodiment according to any of the first through twenty-ninth alternative embodiments, the reservoir egress assembly is formed of an FDA compliant medical grade UV resistant material.

In a thirty-first alternative embodiment according to any of the first through thirtieth alternative embodiments, the reservoir egress assembly further comprises a first flexible connector and a second flexible connector, the first flexible connector being engaged to the first transparent tube and the second flexible connector being engaged to the second flexible tube.

In a thirty-second alternative embodiment according to any of the first through thirty-first alternative embodiments, the first transparent tube provides agitation to a water column in the reservoir for Ultra-Violet germicidal irradiation of the water column.

In a thirty-third alternative embodiment according to any of the first through thirty-second alternative embodiments, the agitation of the water column occurs by one of the group consisting essentially of input of air pressure, operation of a dental apparatus, and manipulation of a purge valve.

In a thirty-fourth alternative embodiment according to any of the first through thirty-third alternative embodiments, the device further comprises a power purge control box in communication with the purge valve, the purge valve being in communication with the purge output port.

In a thirty-fifth alternative embodiment according to any of the first through thirty-fourth alternative embodiments, the power purge control box comprises a programmable timer module.

In a thirty-sixth alternative embodiment according to any of the first through thirty-fifth alternative embodiments, the light emitting diode light unit comprises a symmetrical upper assembly and a symmetrical lower assembly, the upper assembly having an a window and the lower assembly having a DC power adaptor.

In a thirty-seventh alternative embodiment according to any of the first through thirty-sixth alternative embodiments, the light emitting diode light unit is releasably engaged to a base mount assembly.

In a thirty-eighth alternative embodiment according to any of the first through thirty-seventh alternative embodiments, the base mount assembly is releasably engaged to a dental delivery case or a vacuum dental unit case.

In a thirty-ninth alternative embodiment according to any of the first through thirty-eighth alternative embodiments, the dental delivery case or the vacuum dental unit case each comprises an interior comprising a reflective liner, the reflective liner being constructed and arranged to distribute germicidal light within the interior of the dental delivery case or the interior of said vacuum dental unit case when either of the dental delivery case or the vacuum dental unit case is manipulated into a closed configuration.

In a fortieth alternative embodiment according to any of the first through thirty-ninth alternative embodiments, the vacuum efflux assembly is in communication with a solids collector and air vacuum filter.

In a forty-first alternative embodiment according to any of the first through fortieth alternative embodiments, the vacuum adapter assembly further comprises a luer fitting, the luer fitting being constructed and arranged to receive a bactericidal or virucidal agent for entry into the efflux intake manifold and the vacuum efflux reservoir.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

We claim:

1. A device to improve asepsis during dental delivery comprising:
   a transportable dental delivery case comprising walls, a base mount assembly and a self-contained water delivery apparatus, wherein said base mount assembly is symmetrical having an upper connection assembly and a lower connection assembly;
   said base mount assembly comprising a light emitting diode light unit emitting light having a wavelength between 270 nm and 280 nm, said light emitting diode light unit being releasably engaged to said base mount assembly;
   said self-contained water delivery apparatus comprising a reservoir positioned above and engaged to said light emitting diode light unit, said reservoir comprising an interior, said reservoir being constructed and arranged to contain a liquid to be treated with said light immediately prior to transfer to a dental device, said liquid being disposed in said interior; and
   a reservoir egress assembly, said reservoir egress assembly being releasably engaged to said reservoir opposite to said light emitting diode light unit, said reservoir egress assembly comprising an air conduit and a fluid conduit, said air conduit comprising a first UV transparent open-ended tube being formed of quartz or glass, said first UV transparent open-ended tube being disposed in said interior, and said fluid conduit comprising a second UV transparent open-ended tube formed of quartz or glass, said second UV transparent open-ended tube being disposed in said interior, said first UV transparent open-ended tube not being disposed inside of said second UV transparent open-ended tube within said reservoir and said second UV transparent open-ended tube not being disposed inside of said first UV transparent open-ended tube within said reservoir, said second UV transparent open-ended tube extending below said first UV transparent open-ended tube, wherein air is supplied to said first UV transparent open-ended tube providing agitation to said liquid while said liquid is sterilized by ultra-violet germicidal irradiation generated by said light emitting diode light unit.

2. The device according to claim 1, wherein said light emitting diode light unit is releasably engaged to said reservoir.

3. The device according to claim 1, said reservoir egress assembly further comprising an air input port, an air output port, a fluid input port, a fluid output port, a purge input port, and a purge output port.

4. The device according to claim 1, wherein said reservoir egress assembly is formed of a UV resistant material.

5. The device according to claim 4, said reservoir egress assembly further comprising a first flexible connector in said reservoir between said air input port and said first UV transparent open-ended tube and a second flexible connector in said reservoir between said fluid input port and said second UV transparent open-ended tube, said first flexible connector being engaged to said first UV transparent open-ended tube, and said second flexible connector being engaged to said second UV transparent open-ended tube wherein, said first flexible connector and said second flexible connector facilitate ease of attachment and release of said reservoir to said reservoir egress assembly.

6. The device according to claim 5, wherein said liquid within said reservoir has a first level and wherein said first flexible connector and said second flexible connector are disposed above said first level, said first UV transparent open-ended tube having a first diameter and said second UV transparent open-ended tube having a second diameter, said first flexible connector having a first internal diameter having a dimension approximately equal to said first diameter and said second flexible connector having a second internal diameter having a dimension approximately equal to said second diameter.

7. The device according to claim 6, wherein said first flexible connector and said second flexible connector are not transparent.

8. The device according to claim 5, wherein said liquid is a water column and agitation of said water column occurs by one of the group consisting of input of air pressure, operation of a dental apparatus, and manipulation of a purge valve.

9. The device according to claim 1, wherein said light emitting diode light unit has a symmetrical upper assembly and a symmetrical lower assembly, said upper assembly having a window and said lower assembly having a DC power adaptor.

10. The device according to claim 1, wherein said dental delivery case has a first open configuration, a second closed configuration, an interior, a reflective liner applied to said walls within said interior, said reflective liner being constructed and arranged to distribute germicidal light within said interior in said second closed configuration.

11. A device to improve asepsis during dental delivery comprising:
a transportable dental delivery case comprising walls, a base mount assembly and a self-contained water delivery apparatus, said base mount assembly comprising a light emitting diode light unit emitting light having a wavelength between 270 nm and 280 nm;
a self-contained water delivery apparatus comprising a reservoir positioned above and engaged to said light emitting diode light unit, said reservoir comprising an interior, said reservoir being constructed and arranged to contain a liquid to be treated with said light immediately prior to transfer to a dental device, said liquid being disposed in said interior, said light being transmitted into said interior; and
a reservoir egress assembly, said reservoir egress assembly being engaged to said reservoir opposite to said light emitting diode light unit, said reservoir egress assembly comprising an air conduit and a fluid conduit, said air conduit comprising a first UV transparent open-ended tube disposed in said interior, and said fluid conduit comprising a second UV transparent open-ended tube disposed in said interior, said first UV transparent open-ended tube not being disposed inside of said second UV transparent open-ended tube within said reservoir and said second UV transparent open-ended tube not being disposed inside of said first UV transparent open-ended tube within said reservoir, said second UV transparent open-ended tube extending below said first UV transparent open-ended tube, said reservoir egress assembly further comprising an air input port, and air output port, a fluid input port, a fluid output port, a purge input port, and a purge output port, wherein air is supplied to said first UV transparent open-ended tube providing agitation to said liquid while said liquid is sterilized by ultra-violet germicidal irradiation generated by said light emitting diode light unit.

12. The device according to claim 11, wherein said light emitting diode light unit is releasably engaged to said base mount assembly.

13. The device according to claim 12, wherein said light emitting diode light unit is releasably engaged to said reservoir.

14. The device according to claim 13, wherein said reservoir egress assembly is formed of a UV resistant material.

15. The device according to claim 14, said reservoir egress assembly further comprising a first flexible connector in said reservoir and a second flexible connector in said reservoir, said first flexible connector being engaged to said first UV transparent open-ended tube and said second flexible connector being engaged to said second UV transparent open-ended tube wherein, said first flexible connector and said second flexible connector facilitate ease of attachment and release of said reservoir to said reservoir egress assembly.

16. The device according to claim 15, wherein said liquid within said reservoir has a first level and wherein said first flexible connector and said second flexible connector are disposed within said reservoir above said first level.

17. The device according to claim 16, wherein said first flexible connector and said second flexible connector are not transparent.

18. The device according to claim 15, wherein said liquid is a water column and agitation of said water column occurs by one of the group consisting of input of air pressure, operation of a dental apparatus, and manipulation of a purge valve.

19. The device according to claim 11, wherein said light emitting diode light unit has a symmetrical upper assembly and a symmetrical lower assembly, said upper assembly having a window and said lower assembly having a DC power adaptor said light emitting diode light unit further having a heat sink and an internal ultracapacitor or rechargeable battery.

20. The device according to claim 11, wherein said dental delivery case has a first open configuration, a second closed configuration, an interior, a reflective liner applied to said walls within said interior, said reflective liner being constructed and arranged to distribute germicidal light within said interior in said second closed configuration.

* * * * *